(12) United States Patent
Hacker

(10) Patent No.: US 10,160,050 B2
(45) Date of Patent: Dec. 25, 2018

(54) REAMING HEAD INTERFACE

(71) Applicant: KENNAMETAL, INC., Latrobe, PA (US)

(72) Inventor: Michael Hacker, Nuremberg (DE)

(73) Assignee: KENNAMETAL, INC., Latrobe, PA (US)

( * ) Notice: Subject to any disclaimer, the term of this patent is extended or adjusted under 35 U.S.C. 154(b) by 170 days.

(21) Appl. No.: 14/711,458

(22) Filed: May 13, 2015

(65) Prior Publication Data

US 2015/0328703 A1    Nov. 19, 2015

(30) Foreign Application Priority Data

May 14, 2014    (DE) .................... 10 2014 209 135

(51) Int. Cl.
*B23D 77/00* (2006.01)
*B23C 5/10* (2006.01)
*B23B 31/00* (2006.01)

(52) U.S. Cl.
CPC .......... *B23D 77/006* (2013.01); *B23B 31/005* (2013.01); *B23C 5/10* (2013.01); *B23D 77/00* (2013.01); *B23B 2231/0204* (2013.01); *B23B 2260/132* (2013.01); *B23C 2210/02* (2013.01); *B23D 2277/02* (2013.01); *B23D 2277/06* (2013.01); *B23D 2277/74* (2013.01); *Y10T 407/14* (2015.01); *Y10T 407/1906* (2015.01);

(Continued)

(58) Field of Classification Search
CPC .............. B23D 77/006; B23D 2277/02; B23D 2277/06; B23D 2277/74; B23B 2240/24; B23B 2251/02; B23C 2210/02
See application file for complete search history.

(56) References Cited

U.S. PATENT DOCUMENTS 4,040,765 A    8/1977    Vig
4,166,711 A    9/1979    Kress et al.
(Continued)

FOREIGN PATENT DOCUMENTS

CH    702 050 A1    4/2011
DE    100 09 721 A1    12/2002
(Continued)

OTHER PUBLICATIONS

English translation of WO 2007090442 A1, Aug. 2007.*
(Continued)

*Primary Examiner* — Alan Snyder
(74) *Attorney, Agent, or Firm* — Matthew S. Bedsole

(57) ABSTRACT

The invention relates to a tool head for a rotary tool. The tool head extends along, and rotates about, a rotational axis in a rotational direction during operation. The tool head is designed for replaceable fastening on a carrier shank of the rotary tool and comprises on the back thereof a coupling surface comprising a first serration having a plurality of ribs running parallel to one another and grooves running parallel to one another. The first serration comprises at least two part-serrations oriented toward one another in the rotational direction at an angle. Each part-serration having a plurality of ribs and grooves running parallel, for centering the tool head relative to the carrier shank. The invention furthermore relates to a rotary tool having such a tool head.

16 Claims, 1 Drawing Sheet

(52) U.S. Cl.
CPC .... *Y10T 407/1936* (2015.01); *Y10T 408/9095* (2015.01)

(56) References Cited

U.S. PATENT DOCUMENTS

| | | | |
|---|---|---|---|
| 5,607,263 A | 3/1997 | Nespeta et al. | |
| 6,146,060 A | 11/2000 | Rydberg et al. | |
| 6,409,411 B1 | 6/2002 | Crorey | |
| 6,599,050 B1 | 7/2003 | Sjoeoe | |
| 6,626,614 B2 * | 9/2003 | Nakamura | B23B 27/007 407/48 |
| 6,896,450 B2 | 5/2005 | Rothenstein | |
| 7,703,359 B2 | 4/2010 | Englund | |
| 7,748,934 B2 | 7/2010 | Zumsteg et al. | |
| 2003/0143044 A1 | 7/2003 | Rothenstein | |
| 2004/0022594 A1 | 2/2004 | Hecht | |
| 2005/0129477 A1 | 6/2005 | Pantzar | |
| 2007/0081872 A1 | 4/2007 | Blomstedt et al. | |
| 2007/0274794 A1 * | 11/2007 | Cirino | B23B 29/04 408/226 |
| 2007/0274795 A1 * | 11/2007 | Cirino | B23B 51/02 408/233 |
| 2008/0304925 A1 | 12/2008 | Meyer et al. | |
| 2009/0123244 A1 | 5/2009 | Buettiker et al. | |
| 2011/0262234 A1 | 10/2011 | Schuffenhauer et al. | |
| 2012/0121352 A1 * | 5/2012 | Ning | B23D 77/02 408/229 |
| 2013/0071196 A1 | 3/2013 | Oettle | |

FOREIGN PATENT DOCUMENTS

| | | | |
|---|---|---|---|
| DE | 102005041331 A1 * | 3/2007 | ............... B23C 5/10 |
| DE | 102009035690 | 2/2011 | |
| EP | 324909 | 7/1989 | |
| EP | 0 934 135 B1 | 8/1999 | |
| EP | 1 154 872 B1 | 11/2001 | |
| EP | 1 529 587 A1 | 5/2005 | |
| EP | 1738849 A1 * | 1/2007 | ............... B23C 5/10 |
| EP | 1 896 207 A1 | 3/2008 | |
| JP | 10249624 | 9/1998 | |
| WO | WO 9900208 A1 * | 1/1999 | ............. B23B 27/08 |
| WO | 2006/136339 A1 | 12/2006 | |
| WO | WO 2007090442 A1 * | 8/2007 | ............. B23B 27/16 |

OTHER PUBLICATIONS

Jul. 21, 2015 Notice of Allowance 1020142091357.
German Patent Office, "Office Action for DE 10 2014 209 136.7 (and English language translation)", dated Feb. 24, 2015, 5 pp.

* cited by examiner

REAMING HEAD INTERFACE

CROSS-REFERENCE TO RELATED APPLICATIONS

This application claims priority from and claims the benefit of German Application Number 102014209135.7 filed May 14, 2014, the contents of which is incorporated by reference herein.

BACKGROUND

Field of the Invention

The present invention relates to a tool head for a rotary tool, said tool head extending along a rotational axis and rotating about the same in a rotational direction during operation, the tool head being designed for replaceable fastening on a carrier shank of the rotary tool and comprising on a back thereof a coupling surface comprising a first serration having a plurality of grooves running parallel to one another and a plurality of ribs running parallel to one another. The invention further relates to a rotary tool having such a tool head.

Background Information

An example of a prior tool head upon which the present invention improves is described in EP 1 154 872 B1, which discloses in particular a tool coupling having a holder that is detachably connected to an adapter, the holder and the adapter each being provided with a serration, the serrations, in turn, comprising mutually parallel grooves.

Rotary tools, in particular reaming tools, often comprise a replaceable tool head that can be replaced after a certain time in service with a new tool head, without necessitating replacement of the entire rotary tool. For receiving the tool head, the rotary tool typically comprises a carrier shank that extends along the rotational axis of the rotary tool and is driven by a machine tool. The carrier shank is typically connected at an end thereof via a coupling to the tool head. For forming the coupling, the carrier shank and the tool head are connected either directly to one another or are connected to one another by means of an additional fastener.

Rotary tools are understood herein to generally mean such machining tools which rotate about the rotational axis thereof during operation. Such tools are in particular boring tools, milling tools and reaming tools. The latter serve for finishing machining, for example of a previously machined bore. In such reaming tools, high-precision radial alignment of the cutting edges and the most exact concentricity possible are crucial to ensure the desired high-precision machining of the workpiece.

EP 1 529 587 A1 and DE 100 09 721 A1 each disclose reaming tools in which a changeable reaming head is replaceably arranged on a carrier shank.

A further tool head of this type is known, for example, from US 2011/0262234 A1. This tool head has a distributor element for coolant distribution arranged on the end surface thereof. The reaming head is centrally penetrated by a coolant duct into which the distributor element is screwed.

On the one hand, an exact positioning of the tool head relative to the carrier shank is of particular importance in such modular rotary tools. On the other hand, when the torque provided by the machine tool is transmitted from the carrier shank to the tool head, it is in particular the coupling between same that is mechanically stressed.

SUMMARY OF THE INVENTION

The invention seeks to solve the problem of providing a tool head for a rotary tool, as well as such a rotary tool, wherein improved coupling to a carrier shank of the rotary tool is achieved. In particular, good torque transmission from the carrier shank to the tool head should be ensured while providing for high-precision centering of the tool head.

As one aspect of the invention, a tool head is provided. The tool head is designed as a replaceable changeable head for a rotary tool and extends along a rotational axis about which the tool head rotates in a rotational direction during operation. The tool head is designed for replaceable fastening on a carrier shank of the rotary tool and comprises on the back thereof a coupling surface comprising a first serration having a plurality of grooves and ribs extending at least primarily parallel to each other. The first serration furthermore comprises at least two part-serrations oriented toward one another in the rotational direction at an angle, each having a plurality of ribs and grooves running preferably at least primarily parallel for centering the tool head relative to the carrier shank.

As a result of this serration design, good torque transmission from the carrier shank of the rotary tool to the tool head is attained. In particular, the serration advantageously leads to an effective enlargement of the coupling surface compared to a coupling surface having a planar shape. The implementation of the serration having the part-serrations furthermore allows for suitable alignment, in particular self-centering, of the tool head with respect to the carrier shank. It is therefore a particular advantage of the serration that the serration ensures both a precise self-centering and high torque transmission. The serration therefore fulfills two functions in particular.

During operation, the tool head rotates about the rotational axis, which is in particular also a rotational axis of the carrier shank and of the rotary tool as a whole. In other words, the carrier shank and the tool head extend axially along a common rotational axis. The tool head is furthermore designed to be a replaceable component part and is connectable to the carrier shank by means of a detachable coupling. For this purpose, the carrier shank expediently has on the front side thereof a coupling surface and the tool head on the back thereof a coupling surface, the coupling surfaces abutting each other in the connected state. Each coupling surface preferably extends essentially perpendicular to the rotational axis, that is, in a radial direction, thereby enabling a particularly simple mounting of the tool head on the carrier shank. To form the connection, the carrier shank and tool head are joined in particular at the coupling surfaces thereof.

In particular, the serration on the coupling surface of the tool head ensures particularly good centering thereof relative to the carrier shank. For this purpose, the serration is formed as a number of ribs and grooves on or in the coupling surface. In particular, a groove is arranged between each two adjacent ribs and a rib between each two adjacent grooves. The ribs and grooves each run straight in particular and not curved. A structure of this type is achieved during manufacture of the tool head for example in a particularly simple manner by grinding or milling in a predetermined direction, resulting in a serrated or rippled profile running transversely to this direction. In this profile, the ribs each form an elevation having a ridgeline and the grooves each form a depression having a valley line. The distance between two adjacent ridgelines or valley lines along the profile, that is, the period thereof, is preferably constant along the profile and is, for example, approximately 1-2 mm, preferably 1.5 mm. Alternatively, the distance varies along the profile. The ridgelines and the valley lines preferably each lie in a common plane, each plane extending in particular parallel to the coupling surface. The valley lines and the ridgelines furthermore have a particular axial distance from each other, that is, a height which is also preferably only within a range of approximately 1-2 mm, in particular at a preferred profile angle of 60°.

A number of each ribs and grooves of the serration are grouped together into part-serrations. Each of the part-serrations has a preferred direction along which the ribs and grooves thereof extend. The at least two part-serrations therefore have different preferred directions. These preferred directions form an angle that corresponds to the angle at which the part-serrations are oriented toward each other in the rotational direction.

Corresponding to the tool head, the coupling surface of the carrier shank likewise has a so-called second serration that is formed to be complementary to the first serration of the tool head. In other words, the first serration and the second serration engage one another in the connected state. In particular, as a result of the engagement of the mutually angularly arranged part-serrations an advantageous self-centering of the tool head is achieved.

In a preferred embodiment, the ribs and grooves of each part-serration run essentially in a radial direction. This is understood to mean in particular that the ribs and grooves each run at least approximately perpendicular to the rotational axis and essential toward the same.

Preferably, the ribs and grooves of each part-serration run parallel to one another. Some of the ribs and grooves therefore do not run exactly toward the rotational axis. As a result of this parallel arrangement of the ribs and grooves, the tool head becomes particularly easy to manufacture since, for example, for manufacture through grinding, grinding needs to be carried out only in such number of directions corresponding to the number of part-serrations.

The ribs and grooves of two part-serrations in each case are preferably free of mutual overlaps. The two part-serrations are, in particular, part-serrations of the same serration. Such non-overlapping, yet angled arrangement can be attained, for example, by forming the ribs and grooves in the radial direction not over the entire coupling surface but only on an, in particular, annular portion thereof. For example, the tool head has in the axial direction thereof a hole or a leadthrough extending along the rotational axis which results in a hole being formed also in the coupling surface. The leadthrough is designed in particular as a central coolant duct and/or as a bore for screw fastening of the tool head. The ribs and grooves then run outward from the edge of this hole. An overlap of ribs and grooves on any of the coupling surfaces, which would result, in particular, in a formation of islands, thus does not occur.

Between two part-serrations an open region which is free of ribs and grooves is preferably formed in each case in the rotational direction, thereby advantageously further simplifying the manufacture of the coupling surfaces. This embodiment offers in particular an especially simple way to produce a coupling surface that is free of the aforementioned overlaps. In a preferred embodiment, the open region is designed as circular-sector shaped.

An orientation of the tool head relative to the carrier shank as described above is achieved in particular as a result of the ribs and grooves of two associated part-serrations mutually engaging in such a way that movement perpendicular to the preferred direction is prevented. However, movement in the preferred direction is possible in each case and is prevented overall by the described angular arrangement of a plurality of part-serrations. An embodiment that is particularly advantageous in this respect comprises two part-serrations that are oriented crosswise to each other, the angle between the part-serrations being 90°. In principle, additional part-serrations may be present as well. Preferably, however, exactly two and no further part-serrations are formed on the first coupling surface.

The centering attained by means of the serration is particularly suitable for rotary tools requiring a particularly high degree of precision, such as reaming tools for re-machining or finishing of bores. Therefore, the tool head is expediently formed as a reaming head provided with flutes, on the circumferential face of which a number of reaming blades are arranged which preferably extend in an axial direction. Axial direction in this context means a direction perpendicular to the radial direction, extending essentially in the direction of the rotational axis but not necessarily exactly parallel to the same. The reaming blades thus extend along the circumference of the reaming head, like the flutes, and may also run at an incline and, for example, helically. The arrangement of the reaming blades is suitable, in particular, for re-machining the interior wall of bores.

The tool head suitably comprises a carrier into which the flutes have been worked and in which the reaming blades are the blades of separately formed cutting elements that are fastened on the carrier. As a result, the reaming blades can advantageously be produced from a material different from that of the carrier. In particular, the cutting elements are each formed in one piece, preferably as cutting bars, and in particular soldered onto the carrier. By selecting a particularly hard material for the reaming blades, the service life of the tool head is advantageously extended. The cutting elements are made of a hard material such as carbide, ceramics, cermet, CBN or PCD. The carrier, on the other hand, is preferably made of a tool steel. Alternatively, in particular with relatively smaller tool diameters, the tool head is formed as one piece from a hard material.

For connecting the carrier shank and the tool head, the latter is expediently fastenable on the carrier shank via a fastener in the form of a central bolt. For this purpose a leadthrough that is suitably formed as an axially extending through-hole has been worked into the tool head, through which leadthrough the fastener is inserted into a suitable receptacle in the carrier shank and fastened to same. The through-hole in the tool head is preferably formed without a thread. Precise centering and thereby also alignment of the tool head is already achieved by the serration, thereby making it unnecessary to design the bolt connection as precisely fitting as possible for centering purposes. This, in turn, simplifies the manufacture of the tool head and in particular also of the rotary tool in general.

During operation, a coolant is expediently supplied for the cooling of a material surface being machined by the tool head. In order to supply the coolant, in particular from as many sides as possible, the tool head has, in a suitable embodiment, at the front side thereof an axially projecting distributor element into which a number of coolant outlets have been worked. As a result, in particular a coolant supply to the blades from the front of the tool head is made possible. For this purpose the tool head has in particular a central coolant duct through which the coolant fluid can be delivered from the carrier shank to the front of the tool head. The coolant outlets are then preferably worked into the distributor element facing rearward in such a way that the coolant outlets face in the direction of the reaming blades and the coolant accordingly emerges in this direction.

The embodiments and advantages described above in connection with the tool head apply analogously also to a rotary tool having such a tool head.

BRIEF DESCRIPTION OF THE DRAWINGS

Concepts of the present invention will now be described in connection with certain non-limiting embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
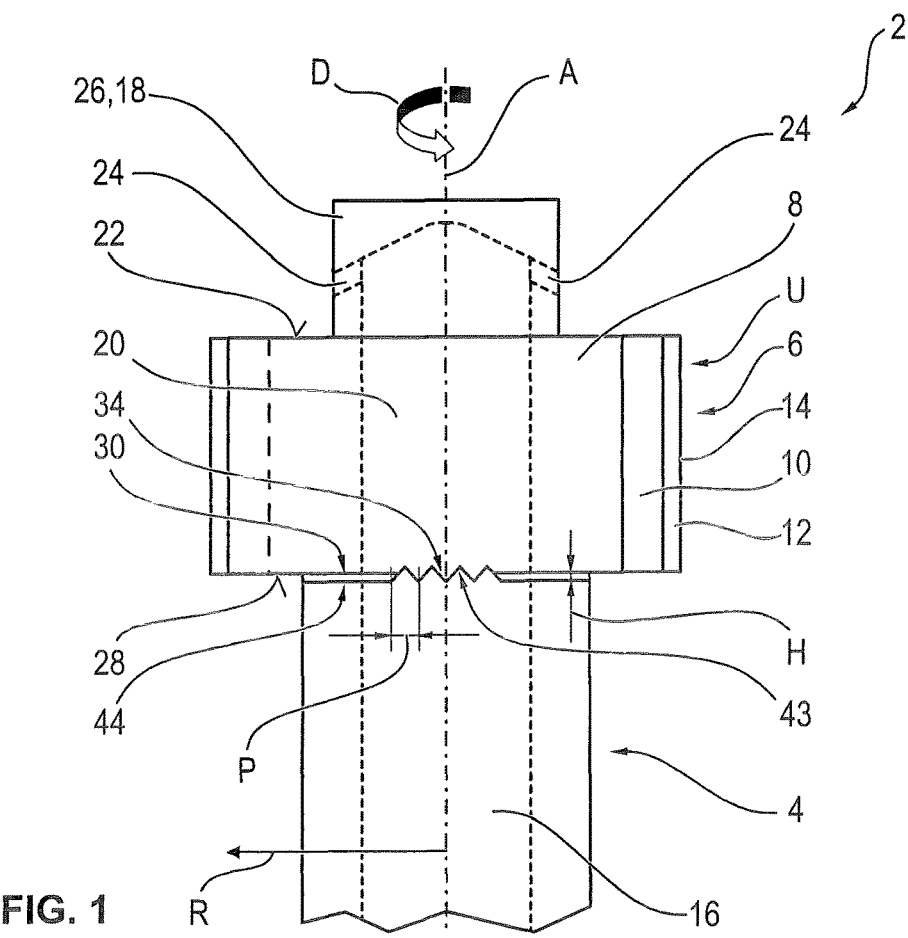
Figure 2:
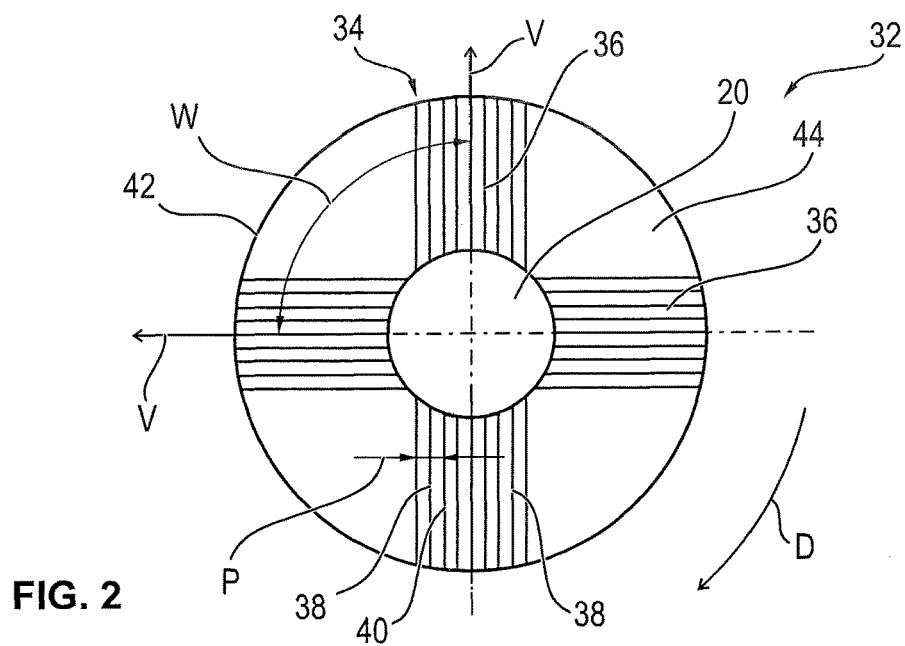

An exemplary embodiment of the invention is explained in greater detail below with reference to a drawing, in which:

FIG. 1 schematically shows a rotary tool having a tool head and a carrier shank, in a side view; and FIG. 2 schematically shows the tool head according to FIG. 1 in a rear view.

In the figures, equivalent parts are provided with the same reference signs.

DESCRIPTION OF EXEMPLARY EMBODIMENTS

FIG. 1 shows a rotary tool 2 formed as a reaming tool, having a tool head 6 fastened to a carrier shank 4. Both extend along a rotational axis A about which in particular the tool head 6 rotates in the rotational direction D during operation. For machining a workpiece, the tool head 6 comprises a carrier 8 into which a number of flutes 10 have been worked which extend essentially in the axial direction, that is, in the direction of the rotational axis A. Separate cutting elements 12 that are preferably made of a hard material are fastened laterally on the flutes 10. These cutting elements 12 each have in the radial direction R on the circumferential face U of the tool head 6 a reaming blade 14 which engages the workpiece for machining. The reaming blades 14, like the flutes 10, extend essentially in the axial direction. The tool head 6 has a larger radial expanse than the carrier shank 4.

In the exemplary embodiment shown here, a central coolant duct 16 extends along the rotational axis A in the carrier shank 4. The coolant duct 16 opens into a distributor element 18 that has been inserted along the rotational axis A into a suitable leadthrough 20 of the tool head 6. On the front side 22 of the tool head 6 the distributor element 18 protrudes in the axial direction, i.e., in the direction of the rotational axis A, and there further comprises a number of, in this case two, coolant outlet openings 24 that face in the direction of the reaming blades 14, i.e. that are aligned rearward-facing.

The distributor element 18 serves, for example, additionally as a fastener 26 for detachable fastening of the tool head 6 on the carrier shank 4. For this purpose, the distributor element 18 is designed sufficiently long in the axial direction for a portion of the distributor element 18 to protrude on the back 28 of the tool head 6. This portion comprises in particular an external thread not shown here in detail, by means of which the distributor element 18 is screwed into an internal thread, also not shown, that has been cut into the carrier shank 4 at the front side. As a result, the back 28 of the tool head 6 is pressed in particular against the front side 30 of the carrier shank 4. The fastener 18 accordingly in this case is a bolt having a central coolant duct 16. In an alternative embodiment not shown here, a coolant supply and a distributor element 18 are dispensed with and the tool head 6 is fastened on the carrier shank 4 only by means of a conventional bolt. In a further alternate embodiment, the distributor element 18 and the fastener 26 are separate components. For example, the tool head 6 has for this purpose a leadthrough 20 having a front and rear thread, the distributor element 18 being screwed in via the front thread and the rear thread serving to connect the tool head 6 and the carrier shank 4 by means of a suitable set screw.

A section of the back 28 of the tool head 6 is shown schematically in FIG. 2. This section at the same time forms a first coupling surface 32 here. Clearly visible is the serration 34 that has been formed there, which, in the exemplary embodiment shown here, comprises two part-serrations 36 arranged in the shape of a cross. Each of the part-serrations 36 comprises a plurality of successive alternating grooves and ribs 38, 40. The ribs 38 each form a ridgeline and the grooves 40 each form a valley line, which define in the axial direction a height H as shown in FIG. 1. The ribs 38 and grooves 40 of the respective part-serration 36 run parallel to each other and extend in the radial direction R, resulting in a saw-toothed profile here that has a particular period P. As a result of this arrangement, each of the part-serrations 36 is given a preferred direction V, indicating the direction in which the ribs 38 and grooves 40 run. The ribs 38 and grooves 40 of one part-serration 36 are rotated by a predefined angle W in the rotational direction D relative to the ribs 38 and grooves 40 of the other part-serration 36. This means that the preferred directions V assigned to the part-serrations 36, in pairs, also form the angle W. In the variant shown here, this angle W is 90°.

Furthermore, it is clearly visible in FIG. 2 that the two part-serrations 36 are formed without overlap, that is, no overlaps of ribs 38 and grooves 40 of the two part-serrations 36 are present. This is achieved here in particular by the central leadthrough 20 being formed as a through-hole. The ribs 38 and grooves 40 thus extend outward from the through-hole on an annular region.

The carrier shank 4 also has on the front side thereof, that is, on the side facing the tool head 6, a coupling surface not specifically shown here, also referred to as a second coupling surface. This second coupling surface is formed complementary to the first coupling surface 32 and comprises in the exemplary embodiment shown here a second serration 43 that is complementary to the first serration 36. The second serration 43 therefore also has two part-serrations arranged in the shape of a cross. In the connected state the ribs 38 of the first coupling surface 32 then engage the grooves 40 of the second coupling surface and vice versa. The second coupling surface is likewise free of overlaps.

The part-serrations 36 do not take up the entire coupling surface 32, instead circular-sector shaped open regions 44 remain in which no ribs 38 and grooves 40 are arranged. In particular, an open region 44 of each the first coupling surface 32 and second coupling surface directly abut one another in the connected state.

In a variant not shown here, more than two part-serrations 36 are present on the coupling surface 32. These are then preferably arranged in the shape of a star, again resulting, in particular, in circular-sector-shaped open regions 44. Within these open regions 44 a small axial distance of less than 0.1 mm typically exists between the surfaces of the tool head 6 and carrier shank 4. The distance is dimensioned sufficiently small so that no dirt particles can enter. The angle W between two adjacent part-serrations 36 in the rotational direction D is then less than 90°, for example 45° or 30°.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be tip embraced therein.

What is claimed is:

1. A tool head for a rotary tool, the tool head extending along a rotational axis and rotating about the same in a rotation direction during operation, the tool head structured for replaceable fastening on a carrier shank of the rotary tool, the tool head comprising:
    a coupling surface disposed on the back face thereof, the coupling surface comprising a first serration having a plurality of ribs and grooves,
    wherein the first serration comprises at least two part-serrations oriented toward one another in the rotational direction at an angle, each part-serration having a plurality of ribs and V-shaped grooves for centering the tool head and transmitting the torque thereof relative to the carrier shank;
    wherein the ribs and grooves of each part-serration run parallel with respect to each other;
    wherein the ribs and grooves of two part-serrations are free of mutual overlaps;
    wherein the ribs and grooves of each part-serration run generally in a radial direction outward from and generally perpendicular to the rotational axis; and
    wherein an open region that is free of ribs and grooves is formed on the coupling surface between the two part-serrations in the rotational direction.

2. The tool head according to claim 1, wherein the open region is formed circular-sector shaped.

3. The tool head according to claim 1, wherein the at least two part-serrations are oriented crosswise to each other and the angle between said part-serrations is 90°.

4. The tool head according claim 1, wherein the tool head is in the form of a reaming head provided with flutes, on the circumferential face of which a number of reaming blades are arranged.

5. The tool head according to claim 4, further comprising a carrier including the flutes and on which a number of separate cutting elements having the reaming blades are fastened.

6. The tool head according to claim 1, wherein the tool head is structured to be fastened on the carrier shank via a fastener in the form of a central bolt.

7. The tool head according claim 1, further comprising an axially projecting distributor element extending from a front face thereof, the distributor having a number of coolant outlet openings.

8. The rotary tool according to claim 1, wherein the ribs and grooves are formed only on an annular portion of the coupling surface around the rotational axis.

9. A rotary tool which extends along, and rotates about, a rotational axis in a rotational direction during operation, the rotary tool comprising:
    a carrier shank; and
    a tool head reversibly replaceably arranged on the carrier shank, the tool head including a coupling surface disposed on a back side of the tool head, the coupling surface comprising a first serration having a plurality of ribs and V-shaped grooves,
    wherein the carrier shank includes a second serration designed to be complementary to the first serration,
    wherein the first serration comprises at least two part-serrations oriented toward one another in the rotational direction at an angle, each having a plurality of ribs and grooves for centering the tool head relative to the carrier shank;
    wherein the ribs and grooves of each part-serration of the first serration run parallel with respect to each other;
    wherein the ribs and grooves of two part-serrations of the first serration are free of mutual overlaps;
    wherein the ribs and grooves of each part-serration of the first serration run generally in a radial direction outward from and generally perpendicular to the rotational axis; and
    wherein an open region that is free of ribs and grooves is formed on the coupling surface between the two part-serrations in the rotational direction.

10. The rotary tool according to claim 9, wherein the open region is formed circular-sector shaped.

11. The rotary tool according to claim 9, wherein the at least two part-serrations of the first serration are oriented crosswise to each other and the angle between said part-serrations of the first serration is 90°.

12. The rotary tool according claim 9, wherein the tool head is in the form of a reaming head provided with flutes, on the circumferential face of which a number of reaming blades are arranged.

13. The rotary tool according to claim 12, further comprising a carrier including the flutes and on which a number of separate cutting elements having the reaming blades are fastened.

14. The rotary tool according to claim 9, wherein the tool head is structured to be fastened on the carrier shank via a fastener in the form of a central bolt.

15. The rotary tool according claim 9, wherein the tool head further comprises an axially projecting distributor element extending from a front face thereof, the distributor having a number of coolant outlet openings.

16. The rotary tool according to claim 9, wherein the ribs and grooves are formed on an annular portion of the coupling surface around the rotational axis.

* * * * *